United States Patent Office 3,527,053
Patented Sept. 8, 1970

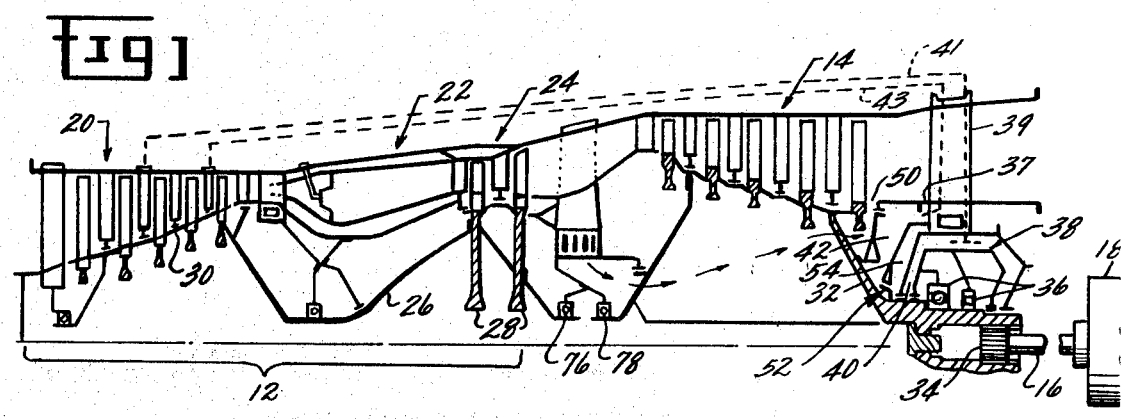
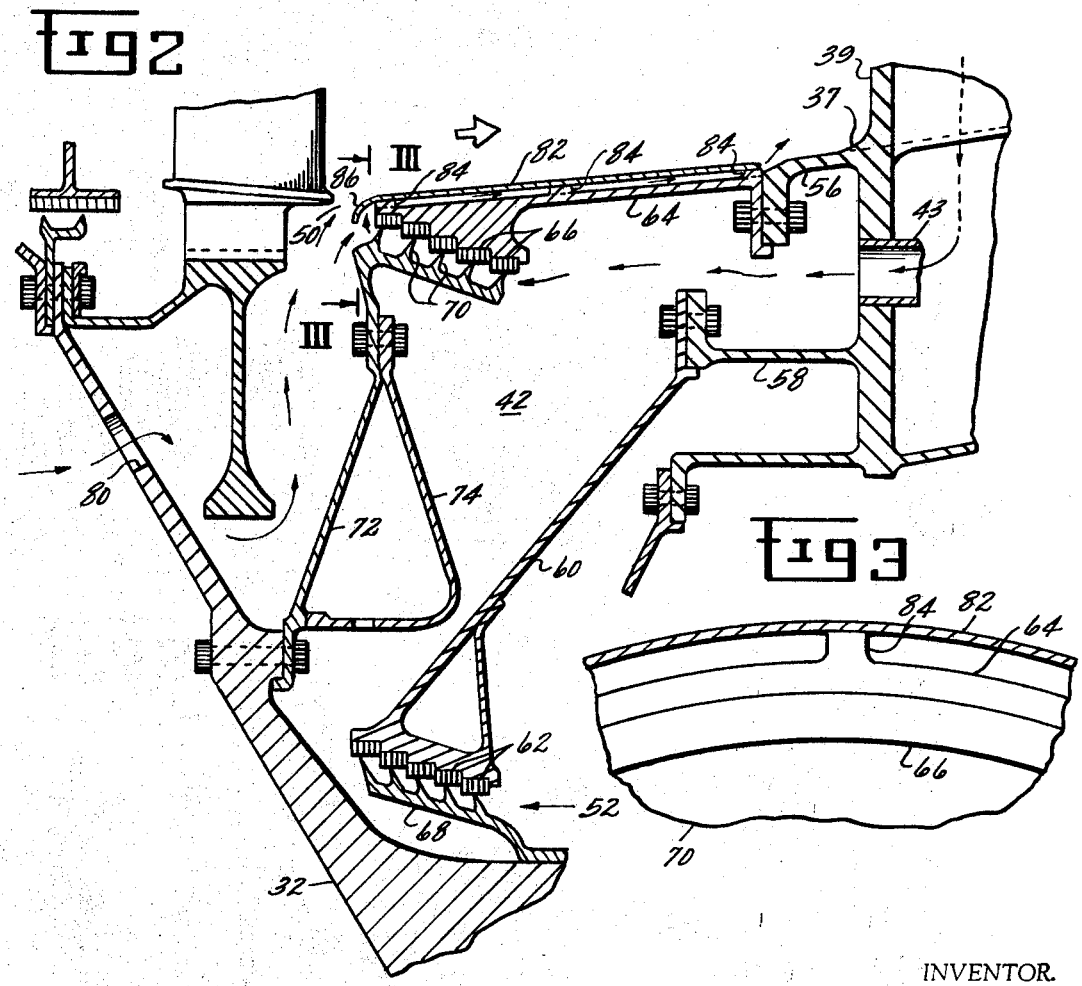

3,527,053
GAS TURBINE ENGINE WITH IMPROVED GAS SEAL
Roy L. Horn, Cincinnati, Ohio, assignor to General Electric Company, a corporation of New York
Filed Dec. 11, 1968, Ser. No. 782,991
Int. Cl. F02c 7/12
U.S. Cl. 60—39.66                    5 Claims

ABSTRACT OF THE DISCLOSURE

In a gas turbine engine, a chamber at the downstream end of a power turbine is pressurized to provide a balancing force on the rotor, minimizing axial loads. This chamber is sealed from the hot gas stream by a labyrinth type, tooth seal. In order to minimize loss of seal effectiveness due to differential thermal growth, the relatively cool air which bleeds through the seal is directed through passageways on the outer surface of the stationary portion of the labyrinth tooth seal.

---

The present invention relates to improvements in gas turbine engines and more particularly to improvements in sealing the annular flow passages of the hot gas stream, at junctures between rotor elements and stationary elements.

Gas seals, as herein contemplated, are of the tooth type or labyrinth tooth type, comprising one or more circumferential teeth on one part which are contiguous with a circumferential sealing surface on another part, with the two parts or elements being relatively rotatable. Such a seal provides a high restriction to gas flow, and, while there is some leakage, it has the advantage of permitting free rotation between the two parts. This type of seal has many other well known advantages and is widely used in gas turbine engines.

The effectiveness of such seals is a function of the clearance between the sealing teeth and the sealing surface. While engine parts can be accurately machined to obtain minimum clearances and a highly effective seal, practical operation of the engine results in seal degradation due to differential thermal growth between the sealing teeth and the sealing surface. This is recognized by the widespread use of honeycomb material and other abradable, readily deformable materials to form the sealing surface with which the labyrinth teeth coact. By this approach, minimum clearances are maintained consistent with the thermal growth experienced in engine operation. In other words, if the sealing teeth grow, for example, at a faster rate than the sealing surface, the sealing surface will be deformed without injury to the sealing teeth. This will automatically establish the minimum clearance available when the sealing surface is at its maximum growth position and the sealing teeth are at their minimum growth position.

The object of the invention is to minimize differential thermal growth between the coacting portions of such seals and thereby improve seal effectiveness under all operating conditions. These ends are broadly attained by maintaining the outer circumferential sealing member, which is exposed to the hotter temperature, at a temperature more closely approximating the temperature of the inner circumferential sealing member.

More specifically, where the seal is provided at the downstream end of a turbine rotor at its juncture with an inner casing member, the sealing surface is formed on the inner surface of the casing. Cooling air is directed along the outer surface of this sealing member to maintain it at a relatively low temperature approximately the temperture of the rotary sealing member. The cooling flow path is defined by an annular shield surrounding the inner casing member and isolating it from the hot gas stream.

The cooling air for this purpose may advantageously be derived from cooling air flowing through the turbine rotor and also from the normal seal leakage air.

The above and other related objects and features of the invention will be apparent from a reading of the following description found in the accompanying drawing and the novelty thereof pointed out in the appended cleams.

In the drawing:

FIG. 1 is a simplified illustration of a gas turbine engine embodying the present invention;

FIG. 2 is an enlarged view of an annular seal seen in FIG. 1; and

FIG. 3 is a section taken on line III—III in FIG. 2.

The gas turbine engine seen in FIG. 1 comprises a core engine or gas generator portion 12 which generates an annular hot gas stream. This gas stream passes to and drives a power turbine 14. The power turbine 14 has an output shaft 16 which may be connected through a flexible coupling 18 to a driven mechanism, as for example an electrical generator.

Gas turbine engines as thus described are well known in the art and their internal components may take many forms. In general, the gas generator 12 further comprises a compressor 20 which pressurizes air for supporting combustion of fuel in a combustor 22 to generate the referenced hot gas stream. This hot gas stream passes through a gas generator turbine 24 prior to driving the power turbine 14.

This type of an engine is generally referred to as a two-shaft engine in which a tubular shaft 26 is joined at one end to the core engine turbine rotor 28 and at its other end to the compressor rotor 30 in a well-known fashion. The second shaft of this engine comprises the power turbine rotor 32 from which the output shaft 16 projects, being connected thereto, as for example by the illustrated splined connection 34.

The downstream end of the power turbine rotor 32 is journaled by a pair of bearings 36 which are housed within an annular sump 38. The bearings 36 are structurally supported by a frame 37 having struts 39 extending through the hot gas stream to an outer casing. A chamber 40 surrounds the sump 38 and is pressurized by relatively low pressure air derived, through line 41, from the gas generator compressor 20 to minimize oil losses from the sump 38.

A balance piston chamber 42 is pressurized by relatively higher pressure air derived, through line 43, from the compressor 20. The chamber 42 is defined by stationary portions mounted on the frame 37 and by portions of the power turbine rotor 32. The chamber 40 requires gas seals 50 and 52 in order that it may be pressurized against the lower pressures existing at the turbine discharge and in a vented chamber 54. The provision of a balancing piston chamber of this type, to minimize thrust loadings on a turbomachinery rotor, is, per se, well known.

The present invention is, in its specific aspects herein illustrated, directed to minimizing leakage of air from this balanced piston chamber 42 through the seal 50. These features of the invention are best understood by reference to FIG. 2, illustrating in greater detail the construction of the balance piston chamber 42. The stationary portions of the chamber 42 are defined by portions of the frame 37, including flanges 56 and 58. A cone 60 is secured to the flange 58 and has a sealing surface at its inner end which is defined by segments of honeycomb material 62. The stationary portions of the chamber 42 are further defined by an annular inner casing 64 which is secured to the frame flange 56 and has on its inner surface segments of honeycomb material 66 which serve as sealing surfaces for the seal 50. The seal 52 is completed by a labyrinth tooth member 68 secured to the power turbine rotor 32. The seal 50 is completed by a series of labyrinth teeth 70 formed on an annular flange 72, secured to the power turbine rotor 32, and in combination with a portion thereof, defines the rotating portions of the balance piston chamber 42. An annular stiffening member 74 is also secured to the flange 72.

The relatively high pressure air line 43 extends through frame strut 39 into the chamber 42. Chamber 42 is thus pressurized to the extent that the seals 50 and 52 are effective in preventing leakage of air therepast.

Referencing FIG. 1 again, momentarily, it will be seen that bearings 76 and 78 respectively journal the rear end of the core engine turbine shaft 26 and the forward end of the power turbine 32. While not shown, the same type sump and sump pressurization chamber are provided for these bearings. Leakage air from this sump pressurization chamber flows through the interior of the turbine rotor 32 and is discharged through a series of openings 80 (FIG. 2) in the rear portion of the power turbine shaft 32. This air eventually passes into the hot gas discharge stream from the power turbine 14.

The rotating portion of the seal 50, comprising the teeth 70, is maintained at the relatively low temperature of the air derived from the compressor 20. This is seen from the fact that one side of these rotating portions are exposed to the balance piston air supplied through line 43, while the other side of these portions are exposed to the relatively cool leakage air passing through the turbine rotor 32 and discharged through the openings 80.

The stationary portions of the seal 50 (the segments 66) are mounted on the casing 64 which normally would define the inner bounds of the hot gas stream discharge from the power turbine.

In accordance with the present invention, this casing is isolated from the hot gas stream by an annular shield 82 which is spaced from the outer surface of the casing 64 to define a cooling air flow path. More specifically, and as is further apparent from FIG. 3, the shield 82 is attached to angularly and axially space lugs 84, projecting from the outer surface of the casing 64, as by brazing or welding.

The relatively cool air from the turbine rotor openings 82 will pass, as indicated in FIG. 2, along the passageway between the shield 82 and the inner casing 64 for ultimate discharge into the hot gas stream. Further, leakage air through the seal 50 will also flow along this passageway. It will be noted that, at the forward end of the shield 82, there is an inturned lip 86 which facilitates directing seal leakage air into the passageway between the shield and the casing 64. The outer surface of the casing 64 will thus be maintained reasonably near the temperature of the components of the rotating portions of the chamber and sealing member.

By thus maintaining the stationary portion of the seal at substantially the same temperature as the rotating portions of the seal, differential thermal expansion is greatly minimized. In this connection it should be noted that the isolated connections between the shield 82 and the casing 64, as well as the relative thinness of the shield 82, result in the shield being a non-structural member so that even though the shield itself may on its outer surface attain a relatively high temperature and corresponding thermal expansion, it will have little or no influence in causing a change in the dimensions of the casing 64 and particularly the sealing surfaces mounted thereon.

While reference has been made herein to thermal expansion, it will be appreciated that the same phenomenon of changes occur in the nature of contractions upon a decrease in temperature. Further, while the invention is in certain aspects particularly directed to the problems of controlling thermal growth where a balance chamber is provided at the discharge end of a power turbine, in its broader aspects, the invention can be effective in overcoming thermal growth problems in other annular seal environments. The scope of the inventive concepts, therefore, is solely to be derived from the following claims.

Having thus described the invention, what is claimed as novel and desired to be secured by Letters Patent of the United States is:

1. A gas turbine engine having an annular, hot gas stream, flow path defined, in part, by a rotor and a relatively stationary inner casing,
   sealing means comprising,
   an inwardly directed, circumferential sealing surface on said casing and an outwardly directed, circumferential sealing surface on said rotors, said surfaces being contiguous to thereby restrictingly seal flow of gas therepast,
   one side of said seal communicating with said hot gas stream,
   means for pressurizing at the other side of said seal with relatively cool air at a pressure higher than that of the hot gas stream,
   said casing including an annular, nonstructural shield surrounding and spaced outwardly from the portion of said casing having the sealing surface formed thereon, the outer surface of said shield being exposed to the hot gas stream, and
   means for directing air, of substantially the same temperature as the rotor sealing surface, between said shield and said casing to minimize differential thermal growth between the casing and rotor sealing surfaces.

2. A gas turbine engine as in claim 1 wherein,
   the casing includes an axially projecting annular flange with the sealing surface at its extremity and
   said shield is of at least approximately the same axial length as the flange, is relatively thin and is connected to said flange at widely spaced points so as to be a nonstructural member.

3. A gas turbine engine as in claim 2 wherein,
   the circumferential sealing surface on said casing comprises a plurality of stepped, cylindrical surfaces, and
   the sealing surface on said rotor comprises a plurality of thin teeth, respectively contiguous with the cylindrical surfaces on said casing, and
   the annular shield has an inwardly directed lip for capturing leakage air from said seal and directing it between said shield and said casing.

4. A gas turbine engine as in claim 3 wherein,
   a flange projects from said rotor and said teeth are formed on the outer surface thereof and means are provided for directing relatively cool air from the interior of said rotor against said flange and, in part, between said shield and casing to further minimize potential thermal growth.

5. A gas turbine as in claim 4 further comprising,
   a frame member from which said inner casing projects in an upstream direction and means for forming, in combination with said rotor flange and said casing, a balance piston chamber and means for pressurizing said balance piston chamber with said relatively cool higher pressure air.

References Cited

UNITED STATES PATENTS 3,043,560  7/1962  Varadi _____ 253—39.1

FOREIGN PATENTS 595,348  12/1947  Great Britain.

CARLTON R. CROYLE, Primary Examiner

U.S. Cl. X.R.

60—39.16, 39.32; 415—180